US008645374B2

(12) United States Patent
Charroppin

(10) Patent No.: US 8,645,374 B2
(45) Date of Patent: Feb. 4, 2014

(54) SYSTEM FOR SELECTIVELY ENABLING DATA TABLES

(75) Inventor: Pascal Charroppin, Trumbull, CT (US)

(73) Assignee: Neopost Technologies, Bagneux (FR)

( * ) Notice: Subject to any disclaimer, the term of this patent is extended or adjusted under 35 U.S.C. 154(b) by 1854 days.

(21) Appl. No.: 11/013,168

(22) Filed: Dec. 15, 2004

(65) Prior Publication Data

US 2006/0155937 A1 Jul. 13, 2006

(51) Int. Cl.
*G06F 17/30* (2006.01)

(52) U.S. Cl.
USPC ............................ 707/736; 711/145; 711/152

(58) Field of Classification Search
None
See application file for complete search history.

(56) References Cited

U.S. PATENT DOCUMENTS

| | | | | |
|---|---|---|---|---|
| 4,504,915 | A * | 3/1985 | Daniels et al. | 705/409 |
| 5,008,827 | A * | 4/1991 | Sansone et al. | 705/409 |
| 5,309,363 | A * | 5/1994 | Graves et al. | 705/403 |
| 5,606,508 | A * | 2/1997 | Thiel | 705/410 |
| 5,661,653 | A * | 8/1997 | Kulik | 705/410 |
| 6,411,959 | B1 * | 6/2002 | Kelsey | 707/101 |
| 2003/0140207 | A1 * | 7/2003 | Nagase et al. | 711/167 |
| 2003/0236798 | A1 * | 12/2003 | Miyawaki et al. | 707/200 |

FOREIGN PATENT DOCUMENTS

| | | |
|---|---|---|
| CA | 2094115 | 10/1993 |

* cited by examiner

*Primary Examiner* — Yuk Ting Choi
(74) *Attorney, Agent, or Firm* — Morris & Kamlay LLP

(57) ABSTRACT

A method of selectively enabling data tables includes accessing data from a first data table, downloading a second data table, upon reaching a predetermined criteria, comparing corresponding data from the first and second data tables each time data is accessed from the first data table, prompting a user to accept the second data table for use if there is a difference between the corresponding data, charging an account of the user if the user accepts the second data table for use in response to the prompt, and performing alternate operations if the user does not accept the second data table for use.

20 Claims, 2 Drawing Sheets

SYSTEM FOR SELECTIVELY ENABLING DATA TABLES

BACKGROUND

The disclosed embodiments relate to the use of data tables, and, more particularly, to techniques for downloading and selectively utilizing different data tables in a device.

BRIEF DESCRIPTION OF RELATED DEVELOPMENTS

Many devices use data tables. For example, postal devices, including meters, scales, inserters, etc., generally use rate tables that include data for computing postage rates for different mail classes. Occasionally, a device may require an update or change to one or more data tables. For example, a postal service customer may establish an account with a postal service provider. When a new rate table is available, the customer may be notified and the customer orders the new table. The table may be then downloaded to the customer's device and the customer's account may be debited. When an updated table is available, the same scenario may be repeated.

It would be advantageous to provide a method for selectively enabling a new data table within a device and to selectively charge a customer based on different usage patterns.

SUMMARY OF THE DISCLOSED EMBODIMENTS

A method of selectively enabling data tables includes accessing data from a first data table, downloading a second data table, upon reaching a predetermined criteria, comparing corresponding data from the first and second data tables each time data is accessed from the first data table, prompting a user to accept the second data table for use if there is a difference between the corresponding data, charging an account of the user if the user accepts the second data table for use in response to the prompt, and performing alternate operations if the user does not accept the second data table for use.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE PREFERRED EMBODIMENTS

Figure 1:
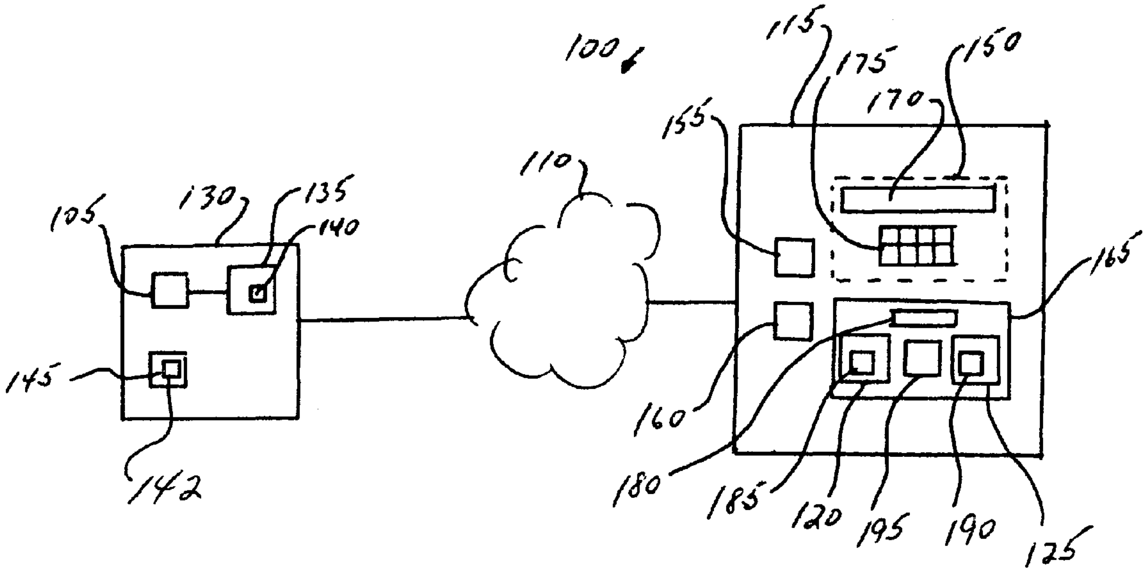
FIG. 1 shows a block diagram of a system suitable for practicing the disclosed embodiments.

FIG. 1 shows a block diagram of a system 100 suitable for practicing the disclosed embodiments disclosed herein. Although the disclosed embodiments will be described with reference to the drawings, it should be understood that the disclosed embodiments can be embodied in many alternate forms. In addition, any suitable size, shape or type of elements or materials could be used.

System 100 includes a device 115 that utilizes data tables, for example a postage meter, connected to a server 130 through a network 110. Device 115 may generally perform an operation, for example, provide indicia that has value, such as postage, tickets allowing admission to an event, coupons allowing the use of a service, and the like. Server 130 may provide updates, programs that allow additional functionality, replacement programs, and other data and information to device 115.

It is an aspect of the disclosed embodiments that server 130 provide device 115 with data tables 120, 125.

Server 130 may include a processor 105 and a database 135 for storing information including data tables to be delivered to device 115. Server 130 may also include a memory 145. Processor 105 generally operates under the control of programs or computer readable program code 142 stored in memory 145 to manage operations of server 130. Server 130 may be coupled to network 110. Network 110 may include any suitable communications network, for example, the Public Switched Telephone Network (PSTN), a wireless network, a wired network, a Local Area Network (LAN), a Wide Area Network (WAN), virtual private network (VPN) etc. Server 130 may communicate with device 115 using any suitable protocol, or modulation standard, for example, X.25, ATM, TCP/IP, V34, V90, etc. When network 110 is implemented as a wireless network, it generally incorporates an air interface utilizing any suitable wireless communication protocol or signaling techniques or standards, for example TDMA, CDMA, IEEE 802.11, Bluetooth, close range RF, optical, any appropriate satellite communication standards, etc.

Device 115 may include a user interface 150, a communications port 155, a microprocessor 160, and a storage device 165. The user interface 150 may include a display 170 for providing information to a user and an input device 175 such as a keyboard, keypad, touchpad, mouse, etc., for receiving information from the user. While the user interface 150 is shown as part of device 115, the user interface may be remote, for example, it may be present at another location and connected to the device 115 through network 110. The communications port 155 may generally provide a communication connection for device 115 to server 130 through network 110. The microprocessor 160 may generally operate under the control of computer readable program code 180 stored in storage device 165 which may be adapted to cause microprocessor 160 to perform certain operations. When the device 115 is a postage meter, those operations may include producing indicia of value as described above. Storage device 165 may utilize optical, magnetic, semiconductor, electronic, or other types of suitable devices to store the program code 180, and may also store one or more data tables, for example, first and second data tables 120, 125. First and second data tables 120, 125 may include data, algorithms, an indexed data base, etc., or any other suitable information.

Figure 2:
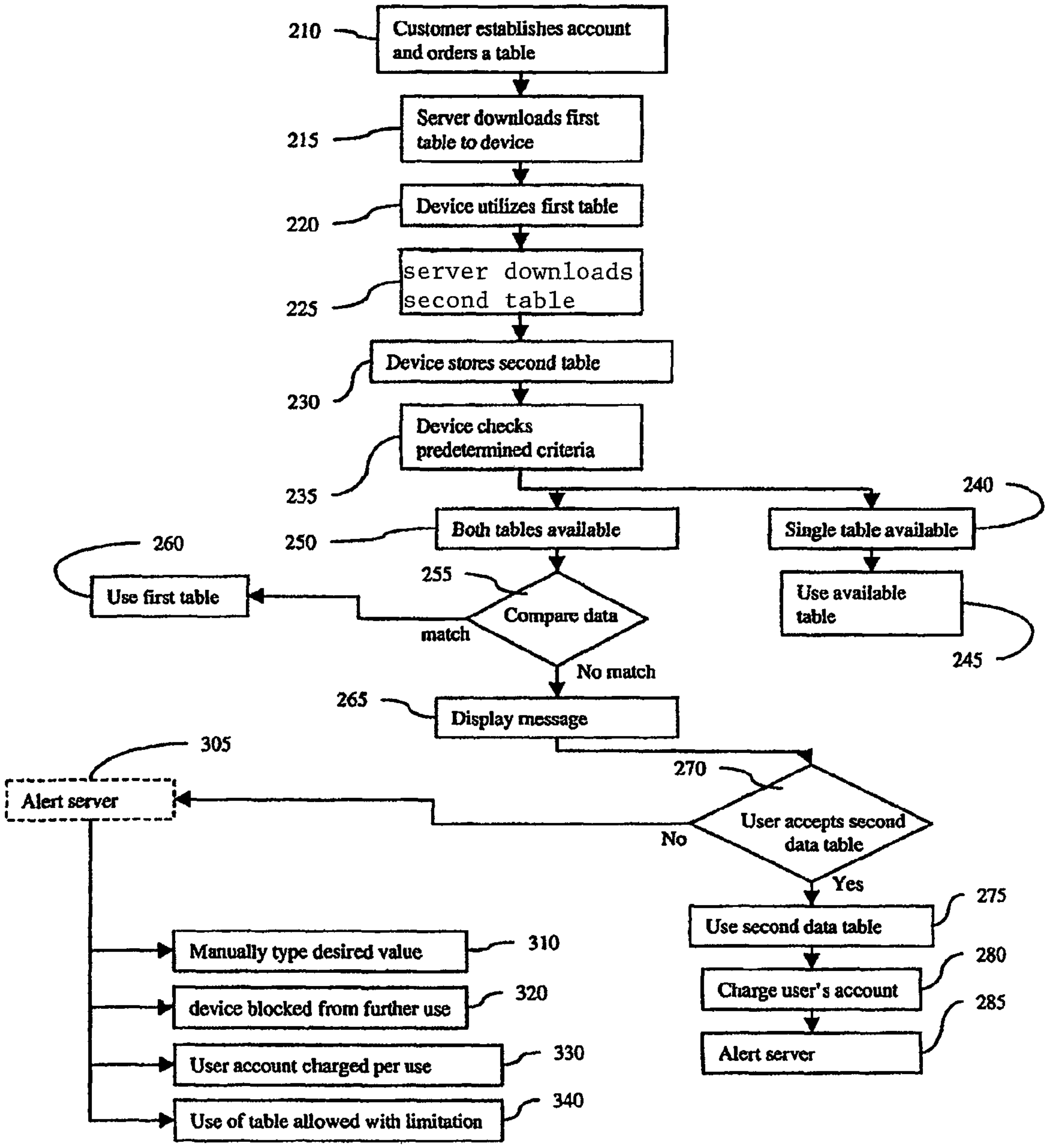
FIG. 2 shows a flow diagram of operations associated with the disclosed embodiments.

FIG. 2 shows a flow diagram of operations associated with the disclosed embodiments. The microprocessor 160 of device 115 may operate under the control of the computer readable program code 180 stored in storage device 165 and the processor 105 of server 130 may operate under the control of programs or computer readable program code 142 stored in memory 145 to perform these operations.

In step 210 a customer may establish an account for a service provided by the server 130. For example, server 130 may be operated by a postal service provider and the customer may establish an account with the postal service provider for purchasing postage. The customer may order the first data table 120, in this example, a rate table use to compute postage rates. In step 215 the server 130 downloads the first data table 120 to the device 115 and in step 220 the device 115 proceeds to utilize the first data table 120.

At some point there may be a need to deliver another data table to the device 115. For example, if postal rates are going to change at a future date it would be advantageous to load the new rates in the form of a table before the new rates become effective. In step 225 the server automatically downloads the second data table 125 to the device 115. This download may occur without any order or authorization on the part of the customer, and generally without any charge to the customer's account. In step 230 the device 115 stores the second data table 125.

The server 130 may also deliver or otherwise provide to device 115 a predetermined criteria, which upon reaching or achieving, causes the device 115 to recognize that the second data table is available for use. For example, the server 130 may provide a number or a count to device 115. When the first data table has been accessed a number of times corresponding to the count, the device 115 may then recognize that the second data table is available. As another example, each of the first and second data tables 120, 125 may have an effectivity date, defined as a date on or after which the respective data table is effective, or is available for use. In one embodiment, the predetermined criteria may be integrated with data tables 120, 125, as designated in FIG. 1 as 185 and 190, respectively. In another embodiment, the predetermined criteria may be stored separately from the data tables 120, 125, as designated in FIG. 1 as 195.

When the first and second data tables are present in the device 115, the device 115 checks the predetermined criteria 185, 190, 195 when access to a data table is required as shown in step 235. In step 240 if the predetermined criteria 185, 190, 195 indicates that a single data table is available for use, in step 245 the device 115 uses that data table exclusively. If both data tables are available as shown in step 250 both data tables are accessed and comparable data from each data table is compared as shown in step 255.

For example, where the predetermined criteria 185, 190, 195 are effectivity dates, and the first and second data tables are present in the device 115, in step 235 the device 115 checks the effectivity date of each data table when access to a data table is required. If the effectivity dates indicate that only a single table is available for use in step 240, the device 115 uses that table exclusively as shown in step 245. If the effectivity dates indicate that both tables are available as shown in step 250 both tables are accessed and comparable data from each table is compared as shown in step 255.

If the comparable data in each table matches, the first table may continue to be used as shown in step 260. If the data does not match, a message may be sent to the user through the user interface 150 asking the user to accept the second table for use as shown in step 265.

The device 115 tests the user's response as shown in step 270. In step 275 if the user answers affirmatively, the second table may be selected for use and in step 280 a charge may be applied to the user's account. This charge may be generally initiated by the device 115 which sends an alert to the server as shown in step 285.

If the user answers negatively, alternate operations may be implemented according to path A. Turning to FIG. 3, if the user does not accept the second table, several alternate operations may occur. The device 115 may optionally send an alert to the server as shown in step 305 and the alternate operations may be controlled by the server 130, the device 115, or a combination thereof.

As one alternate operation, a user may be prompted or otherwise allowed to type in the amount, value, or data to be used, rather than use data from the data tables, as shown in step 310. As another alternate, the device 115 may simply be blocked from further operation as shown in step 320. For example, if the user does not accept the second table the device 115 may be disabled and may require the user to accept the second data table before the device 115 is usable again, or may require the user to contact the service provider to make other arrangements for re-enabling the device 115.

As still another option shown in step 330, the user may be allowed to use the second table and may be charged on a per use basis. For example, if the user does not accept the new rate table, an alert may be sent to the server. The server may enable use of the second table such that the device 115 counts the number of times the second table is accessed. Periodically, the device 115 may connect or be connected to the server 130 (FIG. 1) and report the number, which in turn may trigger a charge to the user's account.

As still another option, a promotional activity may be invoked, where the user may be allowed to use the second table without charge but subject to one or more limitations as shown in step 340. The limitations might include a particular time period, a specified number of accesses or uses, a certain total value expended, etc. Generally with this option, an alert may be sent to the server and the server may enable the particular promotional activity through the device 115.

For example, a user may not accept the second table for use (step 270, FIG. 2). The device 115 may then send an alert to the server which in turn enables use of the table for a particular time period. After the time period expires, the user may be notified and again asked to accept the second table for use.

As another example, the server may limit the number of times the table may be used to a particular number such as five. After the device 115 has accessed the second table five times, other alternate operations may occur, such as the device 115 may be disabled, the user may be alerted, etc.

It should be understood that the foregoing description is only illustrative of the disclosed embodiments. Various alternatives and modifications can be devised by those skilled in the art without departing from the disclosed embodiments. Accordingly, the disclosed embodiments are intended to embrace all such alternatives, modifications and variances which fall within the scope of the appended claims.

What is claimed is:

1. A method of selectively enabling data tables comprising:

accessing data from a first data table provided by a postal service provider;

downloading a second data table from the postal service provider;

upon reaching a predetermined criteria specified by the postal service provider, comparing corresponding data from the first and second data tables each time data is accessed from the first data table;

prompting a user to accept the second table for use if there is a difference between the corresponding data;

charging an account of the user for the second data table if the user accepts the second data table for use in response to the prompt; and performing alternate operations if the user does not accept the second data table for use.

2. The method of claim 1, further comprising alerting a service infrastructure controlling the user account in order to charge the user account.

3. The method of claim 1, wherein the alternate operations include allowing a user to manually input the corresponding data if the user does not accept the second data table for use.

4. The method of claim 1, wherein the alternate operations include blocking the device 115 from further operation if the user does not accept the second data table for use.

5. The method of claim 1, wherein the alternate operations include allowing a user to utilize the second data table and to charge the user account on a per use basis if the user does not accept the second data table for use.

6. The method of claim 1, wherein the alternate operations include allowing a user to utilize the second data table with one or more limitations.

7. The method of claim 6, wherein the one or more limitations include limiting use of the second data table to a particular time period.

8. The method of claim 6, wherein the one or more limitations include limiting use of the second data table to a specified number of accesses.

9. A system for selectively enabling data tables comprising:

a device having circuitry that utilizes a first data table provided by a postal service provider, receives a second data table from the postal data service provider, and stores a predetermined criteria, the circuitry including:

computer readable program code for causing the device to compare corresponding data from the first and second data tables each time the device accesses data from the first data table, upon reaching a predetermined criteria specified by the postal service provider;

computer readable program code for causing the device to operate a user interface to prompt a user to accept the second data table for use if there is a difference between the corresponding data;

computer readable program code for charging an account of the user for the second data table if the user accepts the second data table for use in response to the prompt; and computer readable program code for causing the device to perform alternate operations if the user does not accept the second data table for use.

10. The system of claim 9, wherein the circuitry further includes computer readable program code for causing an alert to a postal service infrastructure controlling the user account in order to charge the user account.

11. The system of claim 9, wherein the alternate operations include allowing a user to manually input the corresponding data if the user does not accept the second data table for use.

12. The system of claim 9, wherein the alternate operations include blocking the device from further operation if the user does not accept the second data table for use.

13. The system of claim 9, wherein the alternate operations include allowing a user to utilize the second data table and to charge the user account on a per use basis if the user does not accept the second data table for use.

14. The system of claim 9, wherein the alternate operations include allowing a user to utilize the second data table with one or more limitations.

15. The system of claim 14, wherein the one or more limitations include limiting use of the second data table to a particular time period.

16. The system of claim 14, wherein the one or more limitations include limiting use of the second data table to a specified number of accesses.

17. A method of providing postage using multiple rate tables in a postage device, the method comprising:

receiving a first rate table from a postal service provider;

providing postage to a user at a rate specified in the first rate table;

receiving a second rate table and a predetermined criteria from the postal service provider;

based on the predetermined criteria, determining that both the first and second rate tables are available for use;

comparing corresponding data in the first and second rate tables;

upon determining that the corresponding data does not match, prompting the user to accept the second rate table;

if the user accepts the second rate table, charging the user for the second rate table and providing postage to the user at a rate specified in the second rate table; and if the user does not accept the second rate table, performing an alternative operation.

18. The method of claim 17, wherein the alternative operation comprises disabling the postage device from providing postage to the user.

19. The method of claim 17, wherein, if the user does not accept the second rate table, the postal service provider disables the postage device from providing postage until the user is charged for the second rate table.

20. The method of claim 17, wherein the alternative operation comprises sending an alert to the postal service provider, prompting the user to provide data, allowing use of the second rate table with a per-use charge, allowing use of the second rate table subject to one or more limitations, or a combination thereof.

* * * * *